US011982683B1

(12) United States Patent
Arbatli (10) Patent No.: US 11,982,683 B1
(45) Date of Patent: May 14, 2024

(54) SYSTEM AND METHOD OF DETECTING SKIMMER AND PUMP BASKET CLOGGING BY SENSING CHANGES IN LOCAL LIQUID PRESSURE

(71) Applicant: Mehmet Arbatli, Tomball, TX (US)

(72) Inventor: Mehmet Arbatli, Tomball, TX (US)

( * ) Notice: Subject to any disclaimer, the term of this patent is extended or adjusted under 35 U.S.C. 154(b) by 251 days.

(21) Appl. No.: 17/750,216

(22) Filed: May 20, 2022

Related U.S. Application Data

(63) Continuation-in-part of application No. 17/227,798, filed on Apr. 12, 2021, now Pat. No. 11,768,142.

(51) Int. Cl.
G01N 15/00 (2024.01)
C02F 1/00 (2023.01)
G01N 9/26 (2006.01)
C02F 103/42 (2006.01)

(52) U.S. Cl.
CPC .............. *G01N 9/26* (2013.01); *C02F 1/008* (2013.01); *C02F 2103/42* (2013.01); *C02F 2209/006* (2013.01); *C02F 2209/03* (2013.01)

(58) Field of Classification Search
CPC ................................ G01N 15/00; G01N 3/18
See application file for complete search history.

(56) References Cited

U.S. PATENT DOCUMENTS

| 3,812,482 A | 5/1974 | Clark |
| 4,662,540 A * | 5/1987 | Schroter ............. G01P 13/0066 137/12 |
| 4,763,525 A | 8/1988 | Cobb |
| 5,083,862 A | 1/1992 | Rusnak |
| 5,182,938 A * | 2/1993 | Merkel ................. G01N 11/08 73/19.05 |
| 5,455,423 A | 10/1995 | Mount et al. |
| 5,960,129 A | 9/1999 | Kleinschmitt |
| 7,231,805 B2 * | 6/2007 | Bretmersky ........... G01N 33/18 73/19.01 |
| 10,352,866 B1 | 7/2019 | Arbatli |

(Continued)

FOREIGN PATENT DOCUMENTS

JP 6666275 B2 * 3/2020 ............ A61M 5/168
WO WO 2017201451 11/2017

OTHER PUBLICATIONS

Machine Translation of JP-6666275-B2 (Year: 2020).*

*Primary Examiner* — Nathaniel J Kolb
(74) *Attorney, Agent, or Firm* — Michael Diaz (57) ABSTRACT

A system for detecting bubbles and clogs by differentiating between the two instances through the observance of a pressure differential range over a specific time in an interior of a pipe having a liquid flow. The system utilizes a pressure sensor and a microcontroller communicating with the sensor to gather pressure readings to determine which one of the two scenarios are present when a pressure drop happens, through determining whether the pressure differential range over a specific time is exceeding a predetermined threshold or not. The microcontroller is configured to determine that when gathered pressure readings fall below a selected minimum acceptable pressure level and the pressure differential range is exceeded for a specific time, bubbles are present in the liquid flowing in the pipe while the microcontroller is also configured that when the pressure differential range is not exceeded with a pressure drop, that a clog is present.

13 Claims, 7 Drawing Sheets

(56) References Cited

U.S. PATENT DOCUMENTS

2006/0090538 A1\* 5/2006 Bretmersky ........... G01N 33/18
73/19.1
2010/0133189 A1\* 6/2010 Maierhofer ......... A61M 1/1656
210/93

\* cited by examiner

SYSTEM AND METHOD OF DETECTING SKIMMER AND PUMP BASKET CLOGGING BY SENSING CHANGES IN LOCAL LIQUID PRESSURE

RELATED APPLICATIONS

This utility application is a continuation-in-part application of co-pending U.S. patent application Ser. No. 17/227,798 entitled "Bubble Detection System and Method Within a Liquid Flow of a Pipe by Sensing Changes in Local Liquid Pressure" filed on Apr. 12, 2021, by Mehmet Arbatli, which is hereby incorporated by reference.

BACKGROUND OF THE INVENTION

Field of the Invention

This invention relates to detectors. Specifically, and not by way of limitation, the present invention relates to a system and method for detecting skimmer and pump basket clogging and bubbles by sensing of changes in local liquid pressure.

Description of the Related Art

At times it is necessary or advantageous to determine if bubbles are present in a specific liquid within a pipe or other type of conduit. In one example, the analysis of blood is used to determine the presence of bubbles which may attach to blood or form air emboli which can be very harmful to patients. In various other applications and industry, it is desirable to be aware of the existence of bubbles in a liquid.

The Applicant, in a co-pending patent application U.S. Ser. No. 17/227,798, provides a unique system and method which utilizes local pressure to determine the presence of bubbles in a pipe or other conduit. In the present invention, the system and method may also be utilized to determine if a circulation system or a skimmer and pump basket in a pool is clogging. It is an object of the present invention to provide such a system and method.

SUMMARY OF THE INVENTION

In one aspect, the present invention is a system for detecting bubbles or clogs an interior of a pipe having liquid flow. The system includes a pressure sensor affixed to the interior of the pipe and a microcontroller communicating with the pressure sensor. The pressure sensor gathers pressure readings of the liquid flowing in the pipe at the location of the pressure sensor and sends the gathered pressure readings to the microprocessor. The microcontroller is provided with a selected minimum acceptable pressure level of pressure within the pipe and a pressure differential range for a specific period of time. The microcontroller is configured to determine that when gathered pressure readings fall below the selected minimum acceptable pressure level and the pressure differential range is exceeded for a specific period of time, bubbles are present in the liquid flowing in the pipe. In addition, the microcontroller is configured to determine that when the gathered pressure readings fall below the selected nominal pressure value and the pressure differential range is not exceeded for a specific period of time, a clog is present.

In another aspect, the present invention is method of detecting bubbles and clogs within an interior of a pipe having a liquid flow. The method includes the steps of affixing a pressure sensor to the interior of the pipe, gathering pressure readings by the pressure sensor of the liquid flowing in the interior of the pipe, and sending the gathered pressure readings to a microcontroller. In addition, a minimum acceptable pressure level and pressure differential range over a specified period of time by which exceedance of the pressure differential range indicates the presence of bubbles are established. The microcontroller determines that when the gathered pressure from the pressure sensor is below the minimum acceptable pressure level and the pressure differential range is exceeded for the preselected period of time, there is the presence of bubbles in the liquid. In addition, the microcontroller determines that when the pressure is below the minimum acceptable pressure level and the pressure differential range is not exceeded for the preselected period of time, a clog is present.

DESCRIPTION OF THE INVENTION

Figure 1:
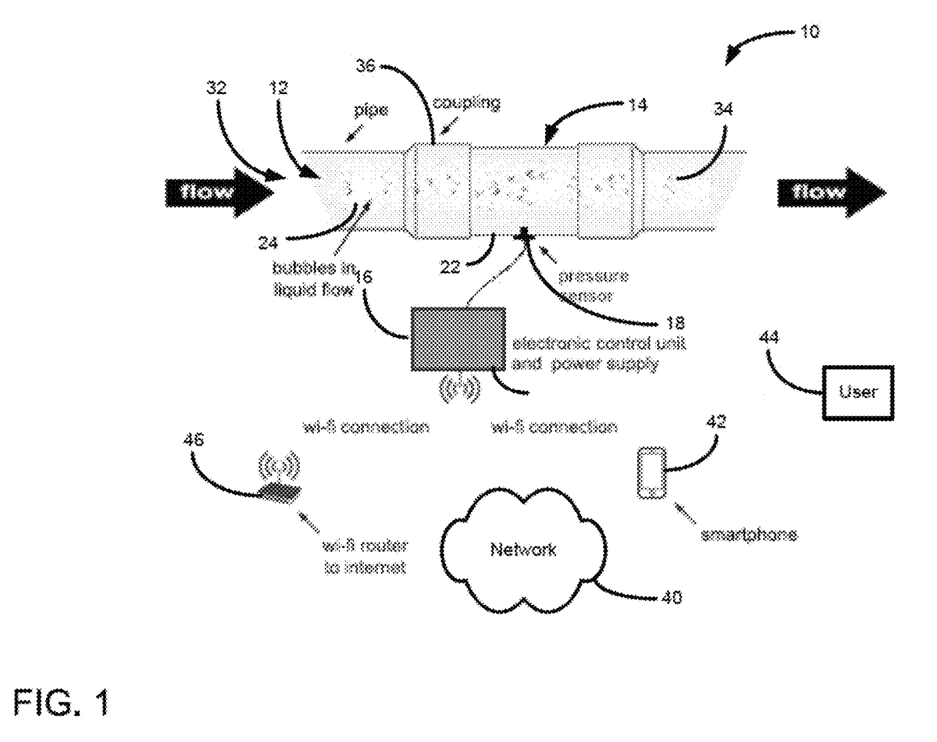
FIG. 1 is a simplified block diagram illustrating major components of a detection system for detecting bubbles 24 within a liquid 12 flow in a pipe 14 as well as clogs in a circulation system such as a skimmer or pump basket assembly in a pool.
Figure 2:
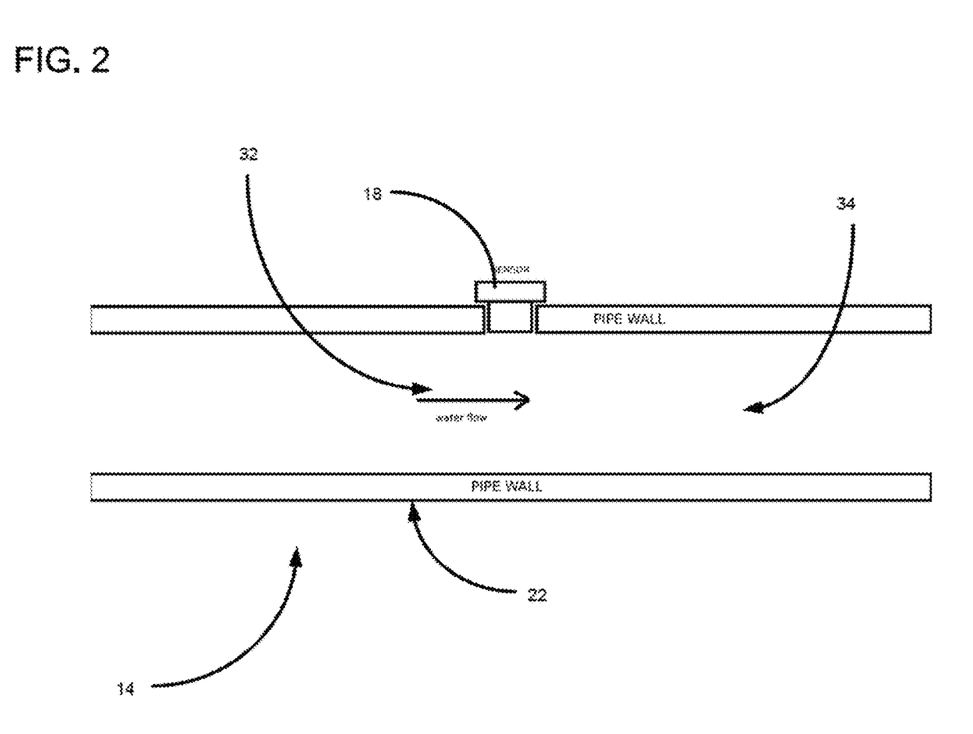
FIG. 2 illustrates a side view of the pressure sensor 18 embedded in the wall of the pipe.

The present invention is a system and method of measuring both the pressure and pressure standard deviation to determine the presence of air bubbles in a liquid flow of a pipe as well as clogging in a skimmer/pump basket assembly of circulation system, such as utilized for a pool. FIG. 1 is a simplified block diagram illustrating major components of a detection system 10 for detecting bubbles 24 within a liquid 12 flow in a pipe 14 as well as clogs in a circulation system. The system includes an electronic control unit 16 communicating with one or more pressure sensors 18. The pressure sensor 18 is affixed to an interior 34 of the pipe 14. The pressure sensor may be any device capable of measuring a pressure of a fluid. One example of such a pressure sensor is the MS5837-30BA manufactured by TE Connectivity. Such a sensor provides an optimized solution for measuring pressure at various water depths in a small module. However, it should be understood that any sensor providing accurate pressure readings in a fluid may be utilized in the present invention. FIG. 2 illustrates a side view of the pressure sensor 18 embedded in the wall of the pipe 14. The pressure sensor is affixed on the wall with the sensor facing the interior of the pipe for measuring the fluid pressure. The electronic control unit 16 and the pressure sensor 18 are powered by a power supply 30. The power supply 30 may be separate units or utilize the same unit to power the electronic control unit 16 and the pressure sensor

18. The pressure sensor 18 is used to determine the local pressure of the liquid at a specific point in the pipe 14. The pipe may be any conduit allowing a flow of the liquid 12. The pipe 14 includes a flow 32 through an interior 34 of the pipe. As illustrated, the pipe may include one or more couplings 36. In one embodiment of the present invention, the electronic control unit 16 may communicate through a wi-fi router 46 to a network 40, such as the Internet to a personal communication device (e.g., a mobile phone 42). A user 44 may send inputs, such as commands and parameters, and receive information through the mobile phone 42 from the electronic control unit 16.

Figure 3:
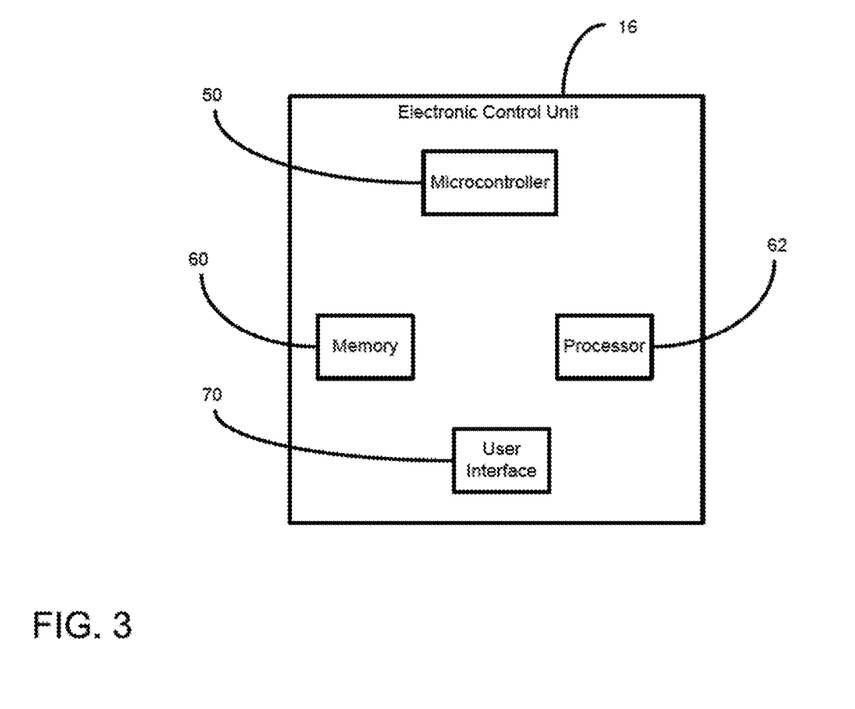
FIG. 3 is a simplified block diagram illustrating the components of the electronic control unit in one embodiment of the present invention.

FIG. 3 is a simplified block diagram illustrating the components of the electronic control unit 16 in one embodiment of the present invention. The electronic control includes a microcontroller 50 which may also include a memory 60 for storing a set of instructions and a processor 62 for executing the instructions. The processer 62 may access information from, and store information in a nonremovable memory, a removable memory, or a combination thereof, also collectively referred to herein as computer readable media. Illustrative nonremovable memory may consist of RAM, ROM, a hard disk, or other well-known memory storage technologies. Illustrative removable memory may consist of one or more Subscriber Identity Module (SIM) cards, or other well-known memory storage technologies, such as "smart cards," magnetic disks, floppy disks, optical disks, magneto-optical disks, magnetic tapes, or any suitable non-volatile memory. As will be discussed below, the set of instructions executed by the processor permit the control of the microcontroller 50. The electronic control unit 16 may also include a user interface 70 for interfacing with the user 44. The user interface may provide a Guided User Interface (GUI) for display on the mobile phone 42 or other communication device utilized by the user 44. The user interface 70 enables the user 44 to receive information from the electronic control unit 16 as well as allow the user to send commands to the electronic control unit 16.

The pipe 14 includes a flow 32 of liquid 12 within its interior 34. The pipe includes at least one pressure sensor for sensing the local pressure of the liquid 12 at the pressure sensor 18. The pressure sensor continuously senses the changes in local liquid pressure. The differences in pressure determine whether the flow is a fully saturated clean liquid flow or a flow interrupted by air bubbles or a clog in the skimmer/pump basket assembly. A pressure differential range is the differential from a baseline value which could be an average value over a period of time. This pressure differential range is analyzed to determine if bubbles are present in the flowing liquid in the pipe or conduit or if clogging is present in the skimmer/pump basket assembly. The present invention preferably continuously collects pressure readings from the pressure sensor and sends it to the microcontroller 50 and processor 82. In one embodiment, the information gathered from the pressure sensor 18 is sent via the Wi-Fi router 46 or other wireless connection. The processor than analyzes the data and determines if interruptions in the liquid flow is caused by passing air bubbles or clogs in the skimmer/pump basket assembly.

Figure 4:
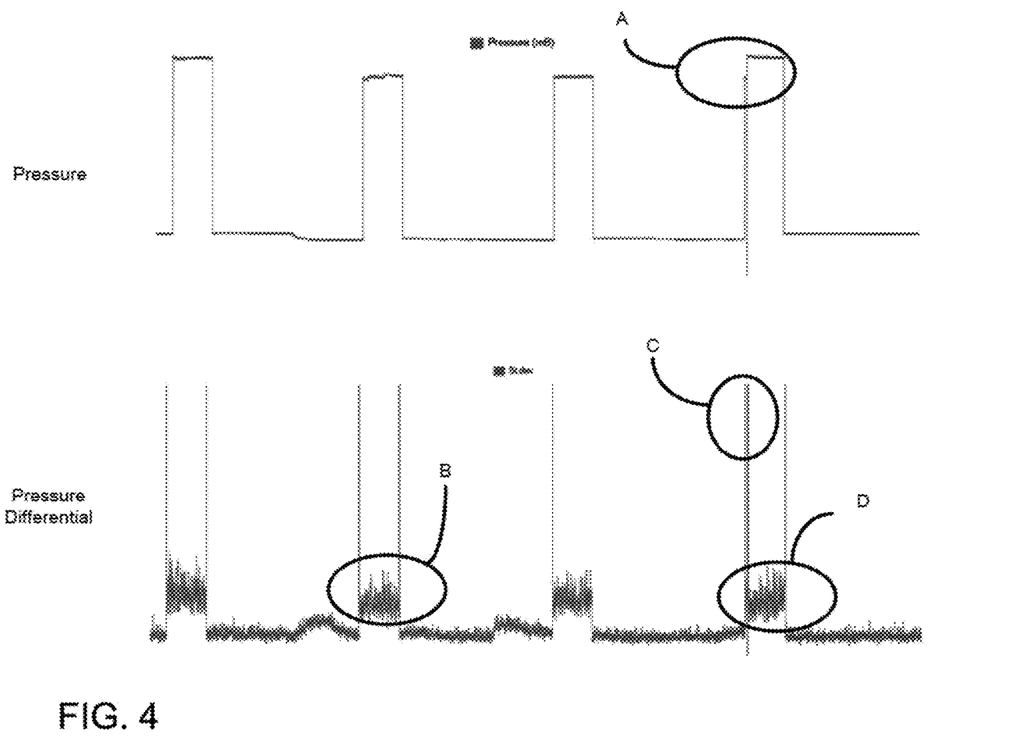
FIG. 4 is an exemplary time versus pressure chart for the pipe for illustrating the presence of bubbles.

In one embodiment, the microcontroller 50 receives the pressure sensor data, i.e., local pressure readings. The microcontroller 50 stores the readings in the memory 60 and through the processor 62 which analyzes the data to determine a differential in pressure readings above a preselected amount over a specified time period. In the present invention, the system is used to differentiate between two possible scenarios: the presence of air bubbles in the circulation system or skimmer and pump basket clogging. FIG. 4 is an exemplary time versus pressure chart for the pipe 14 for illustrating the presence of bubbles, where the pressure is shown on the upper portion and the pressure differential is shown on the lower portion. As shown in FIG. 4, the flow of the fluid is for a pool pipe. In most pool configurations, a pump pumping water through the pipe 14 runs at a high speed and low speed. At point. A, it is shown a high-speed pressure reading where a drop in pressure is observed, and, at the same time, the pressure differential exceeds (high standard deviation) a predetermined level over a period of time, as shown at point C (as compared to point 8, where pressure differential levels are normal). This indicates that air bubbles 24 are entering the pipe 14, further indicating that the water level in the pool is getting lower and air is entering through the skimmer. When water is added to the pool, the pressure turns back to normal, as also seen at point. A. Pressure differential levels also get back to normal, as shown at point D.

Figure 5:
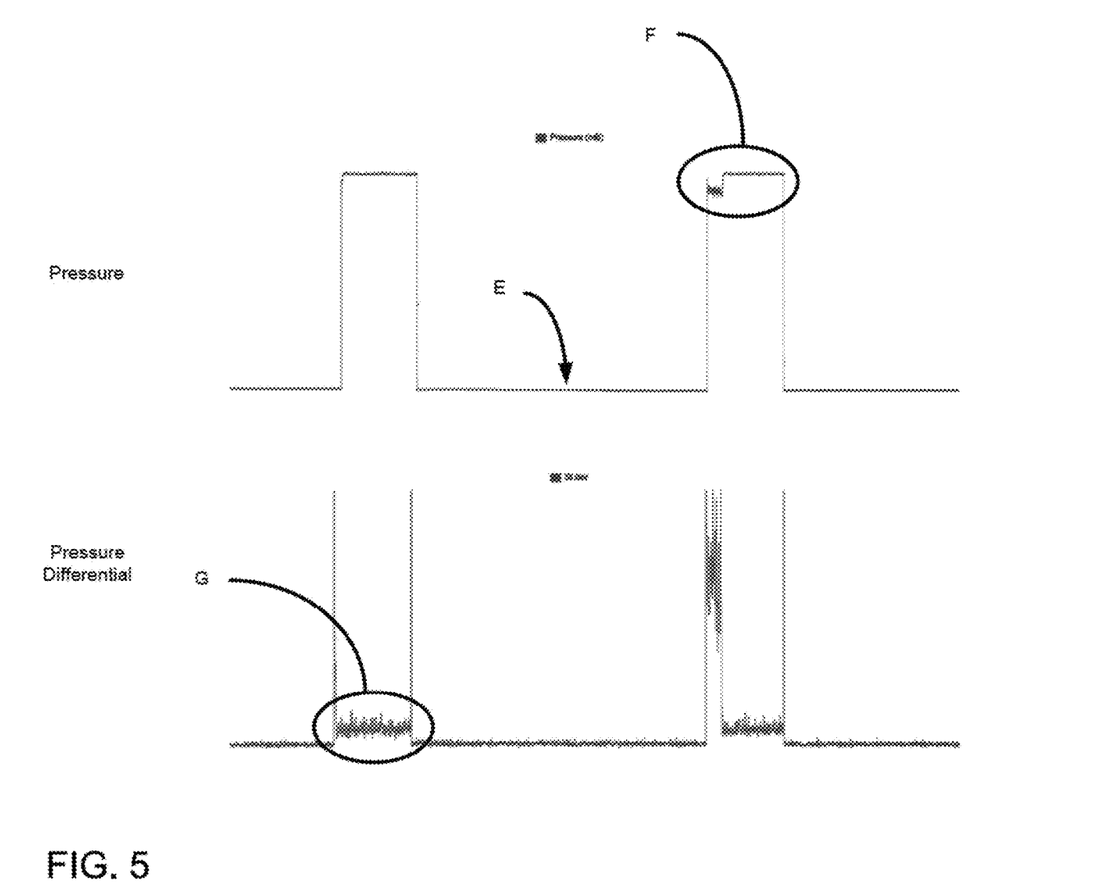
FIG. 5 is an exemplary time versus pressure chart for the pipe on an upper portion and the pressure differential on the lower portion for illustrating the presence of a clog.

FIG. 5 is an exemplary time versus pressure chart on the pipe 14 on an upper portion and the pressure differential on the lower portion for illustrating a clog in a circulatory system. Point. E illustrates a drop in pressure observed. The pressure differential does not exceed a predetermined standard deviation (range), as shown at point G, which indicates that skimmer basket and/or the pump basket is/are clogged. When the clogged baskets are cleaned, pressure returns to normal levels (above a predetermined/select minimum acceptable pressure level) as indicated at point F.

In summary, when the pressure drops, the pressure standard deviation over a specific time is observed to determine which one of the two scenarios is present in the system. If the pressure standard deviation exceeds a predetermined and set limit over a period consistently, this indicates the presence of bubbles, usually meaning a low water level in the pool. If there are no consistent pressure standard deviation increases, the pressure drop indicates that the skimmer basket and/or the pump basket is clogged.

With reference to FIGS. 1-5, the operation of the detection system 10 will now be explained. First, the pressure sensor 18 is positioned within the interior 34 of the pipe 14. The pressure sensor gathers pressure readings at the location and transmits the pressure readings to the microcontroller 50. The microcontroller, through the processor, is programmable to change parameters for detecting bubbles or clogs. A series of pressure readings over a period of time is analyzed. A preselected minimum (nominal) pressure level and a pressure differential range for a specific time period are set and when this preselected minimum pressure level is breached, a further analysis is used to determine if the differential range is exceeded. If it is determined that observed pressure readings are below the preselected minimum pressure level and the pressure differential range is exceeded, the processor determines the presence of bubbles. If it observed that the observed pressure readings are below the preselected minimum pressure level and the pressure differential range is not exceed, the processor determines there is a clog in either the pump basket, skimmer, or other circulatory system component. This preselected pressure differential range (or deviation) over a selected period of time may be determined by the processor based on various parameters (e.g., velocity of flow, size of pipe, type of fluid, etc.) or can be externally selected by the user 44. The present invention may be utilized for any application where the detection of the presence of bubbles or other fluid abnormalities is required. In one application, the present invention may be utilized for detecting bubbles or clogs in a swimming pool filtration system. The microcontroller, through the processor 62, calculates the presence of bubbles or clogs by determining when the preselected minimum pressure is breached as well as the pressure differential range (deviation) of the gathered pressure readings over a selected time period is exceeded. Optional and customizable trigger events may be created and stored within the electronic control unit 16 as desired by the user. The trigger events are fully customizable and allow the user to select a specified range or deviation of the pressure readings for a selected time period. The processed data and customizable trigger events are then sent through the network 40 to other communication devices, such as the mobile phone 42 or some other device, such as a laptop computer, a desktop computer, a tablet, etc. A Message Queuing Telemetry Transport (MATT) cloud service via the local router 46 may be utilized. The parameters of the program on the microcontroller can also be accessed and modified via the Internet by other computing and/or communication devices.

Figure 6A:
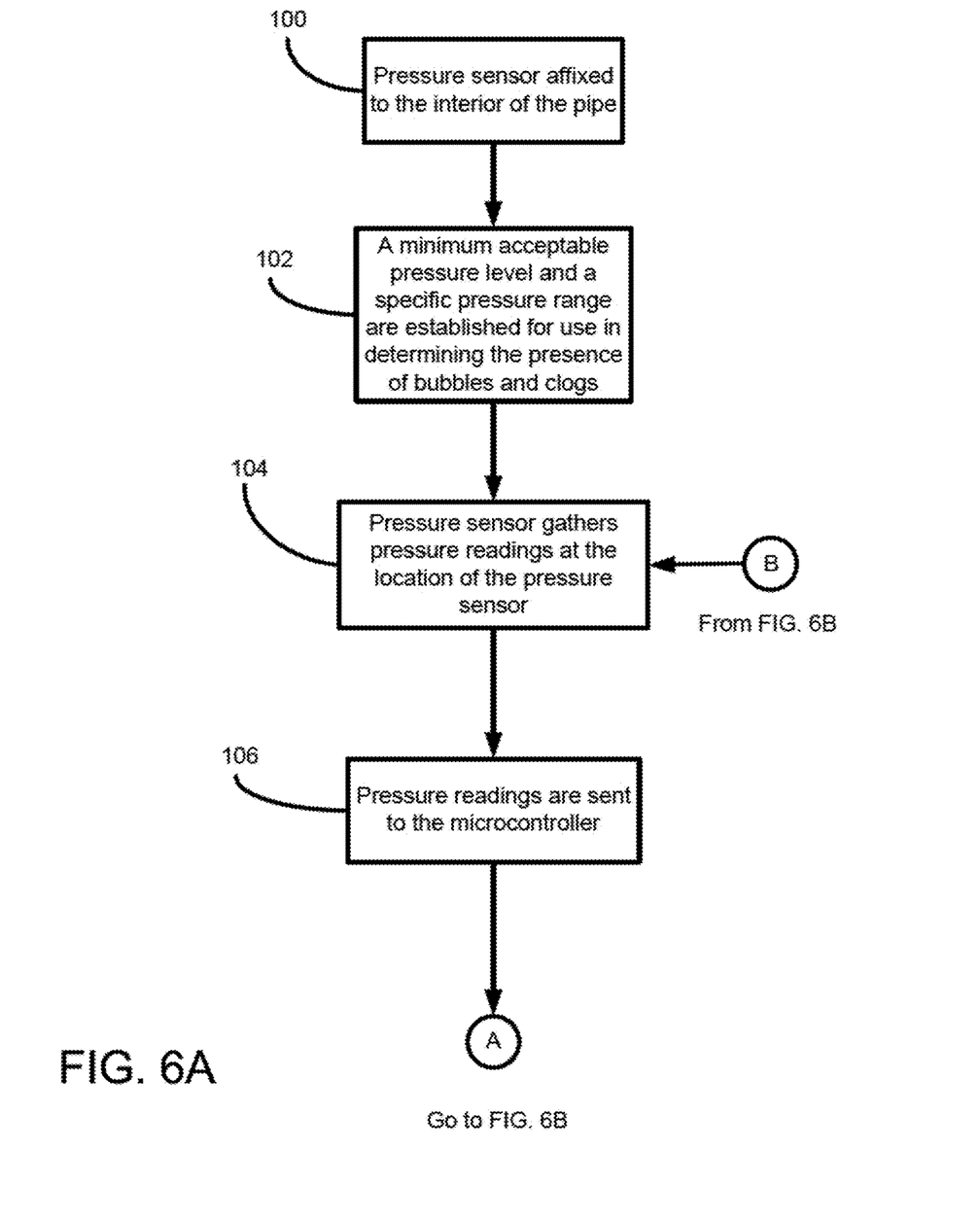
FIGS. 6A and 6B are flow charts illustrates the steps of detecting bubbles in the pipe as well as clogs in a circulation system using the detection system according to the teachings of the present invention.
Figure 6B:
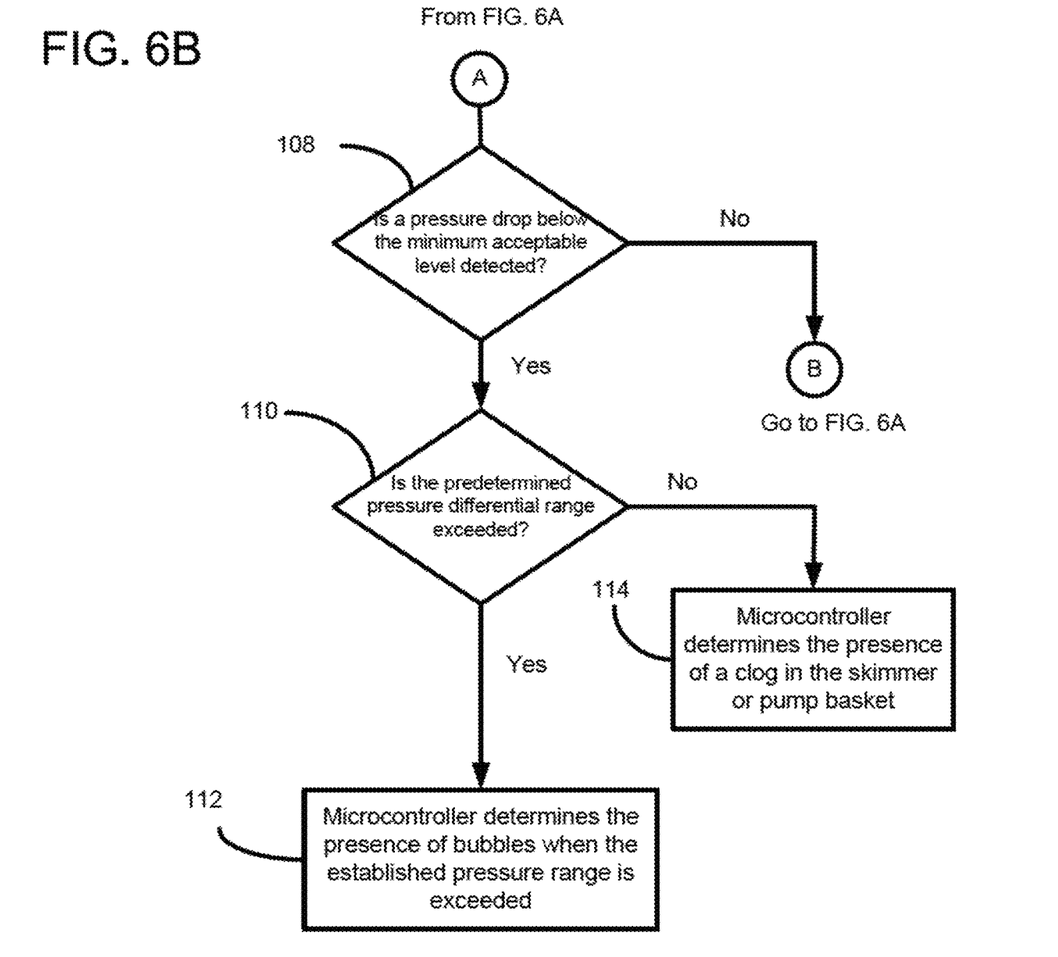

FIGS. 6A and 6B are flow charts illustrating the steps of detecting bubbles in the pipe 14 as well as detecting clogs in a circulatory system using the detection system 10 according to the teachings of the present invention. With reference to FIGS. 1-6, the steps of the method will now be explained. The method begins with step 100 where a pressure sensor is affixed to the interior 34 of the pipe 14. Next, in step 102, a specific pressure differential range over a specific time is established which would indicate the presence of bubbles. In addition, a minimum acceptable pressure level is set which may also be used to detect clogs in components of a circulatory system of a pool. This specific minimum acceptable pressure and pressure differential range or deviation are stored in the memory 60 and utilized by the processor 62. Next, in step 104, the pressure sensor gathers pressure readings at the location of the pressure sensor. In step 106, the gathered pressure readings are sent to the microcontroller 50. Next, in step 108, it is determined by the microcontroller whether there is a drop in pressure from the minimum acceptable pressure level (nominal pressure level). If a drop below the minimum acceptable pressure level is detected in step 108, the method moves to step 110, where it is determined by the microcontroller whether the preselected pressure differential range is exceeded. If it is determined in step 110 that the pressure differential range is exceeded, the method moves to step 112 where the microcontroller, through the processor 62, determines the presence of bubbles. For example, if bubbles were not present in the pipe, the preselected pressure differential range would not be exceeded and the processor 62 would determine that there are no bubbles present in the pipe. However, when bubbles do pass the pressure sensor where the pressure sensor provides pressure readings which have a differential range higher than the preselected pressure differential range, the processor 62 determines that there are bubbles present in the pipe. Referring back to step 110, if it is determined that the pressure differential range is not exceeded, the method moves to step 114 where it determined that there is a clog in the skimmer or pump basket. Optional and customizable trigger events are created and stored within the electronic control unit 16 as desired to provide follow on actions as necessary (e.g., sending alerts to the user through the mobile phone 42). The processed data and customizable trigger events are then sent through the network 40 to other communication devices, such as the mobile phone 42 or some other device such as a laptop computer, a desktop computer, a tablet, etc. A Message Queuing Telemetry Transport (MQTT) cloud service via the local router 46 may be utilized. The parameters of the program on the microcontroller can also be accessed and modified via internet by other computing and/or communication devices. Referring back to step 108, if it is determined that there is not a drop in pressure, the method returns to step 104 where the pressure sensor continues to gather pressure readings.

The present invention provides many advantages over existing systems. The present invention provides a system for detecting bubbles as well as clogs which is accurate and is adaptable to conditions, as necessary. The present invention utilizes pressure readings obtained from one or more pressure sensors. These pressure readings can provide real-time evidence of the presence of bubbles or clogs. Additionally, the present invention utilizes a programmable microcontroller which enables a user to easily change the parameters of the detection system without replacing electronic components.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is therefore intended by the appended claims to cover any and all such applications, modifications, and embodiments within the scope of the present invention.

What is claimed is:

1. A system for detecting bubbles or clogs an interior of a pipe having liquid flow, the system comprising:
   a pressure sensor affixed to the interior of the pipe;
   a microcontroller communicating with the pressure sensor;
   wherein the pressure sensor gathers pressure readings of the liquid flowing in the pipe at the location of the pressure sensor and sends the gathered pressure readings to the microprocessor;
   wherein the microcontroller is configured to be provided with a selected minimum acceptable pressure level of pressure within the pipe and a pressure differential range for a specific period of time;
   wherein the microcontroller is configured to determine that when gathered pressure readings fall below the selected minimum acceptable pressure level and the pressure differential range is exceeded for a specific period of time, bubbles are present in the liquid flowing in the pipe;
   wherein the microcontroller is configured to determine that when the gathered pressure readings fall below the selected nominal pressure value and the pressure differential range is not exceeded for a specific period of time, a clog is present.

2. The system according to claim 1 wherein the liquid flowing through the pipe is water.

3. The system according to claim 1 further comprising a communication device communicating with the microcontroller via a network.

4. The system according to claim 3 wherein the communication device provides instruction and receives information from the microcontroller.

5. The system according to claim 1 wherein the microcontroller is programmable for changing parameters for determining the presence of bubbles or clogs.

6. The system according to claim 1 wherein the microcontroller executes an action based on the presence of bubbles or a clog in the liquid flowing through the pipe.

7. The system according to claim 1 wherein:
the pipe is associated with a pump basket and skimmer of a pool; and
the clog is located in the pump basket or skimmer of the pool.

8. A method of detecting bubbles and clogs within an interior of a pipe having a liquid flow, the method comprising the steps of:
affixing a pressure sensor to the interior of the pipe;
gathering pressure readings by the pressure sensor of the liquid flowing in the interior of the pipe;
sending the gathered pressure readings to a microcontroller;
establishing a minimum acceptable pressure level and pressure differential range over a specified period of time by which exceedance of the pressure differential range indicates the presence of bubbles; and
determining, by the microcontroller, when the pressure gathered by the pressure sensor is below the minimum acceptable pressure level and the pressure differential range is exceeded for the preselected period of time, a presence of bubbles in the liquid; and
determining, by the microcontroller, when the pressure gathered by the pressure sensor is below the minimum acceptable pressure level and the pressure differential range is not exceeded for the preselected period of time, a presence of a clog.

9. The method according to claim 8 wherein the liquid flowing through the pipe is water.

10. The method according to claim 8 further comprising the step of communicating, by the microcontroller, with a communication device via a wireless network.

11. The method according to claim 10 wherein the communication device provides instruction and receives information from the microcontroller.

12. The method according to claim 8 further comprising the step of executing an action by the microcontroller, based on exceedance of the preselected pressure range from the gathered pressure readings.

13. The method according to claim 8 wherein:
the pipe is associated with a pump basket and skimmer of a pool; and
the clog is located in the pump basket or skimmer of the pool.

\* \* \* \* \*